O. E. BYRON.
TRAILER.
APPLICATION FILED FEB. 18, 1918.

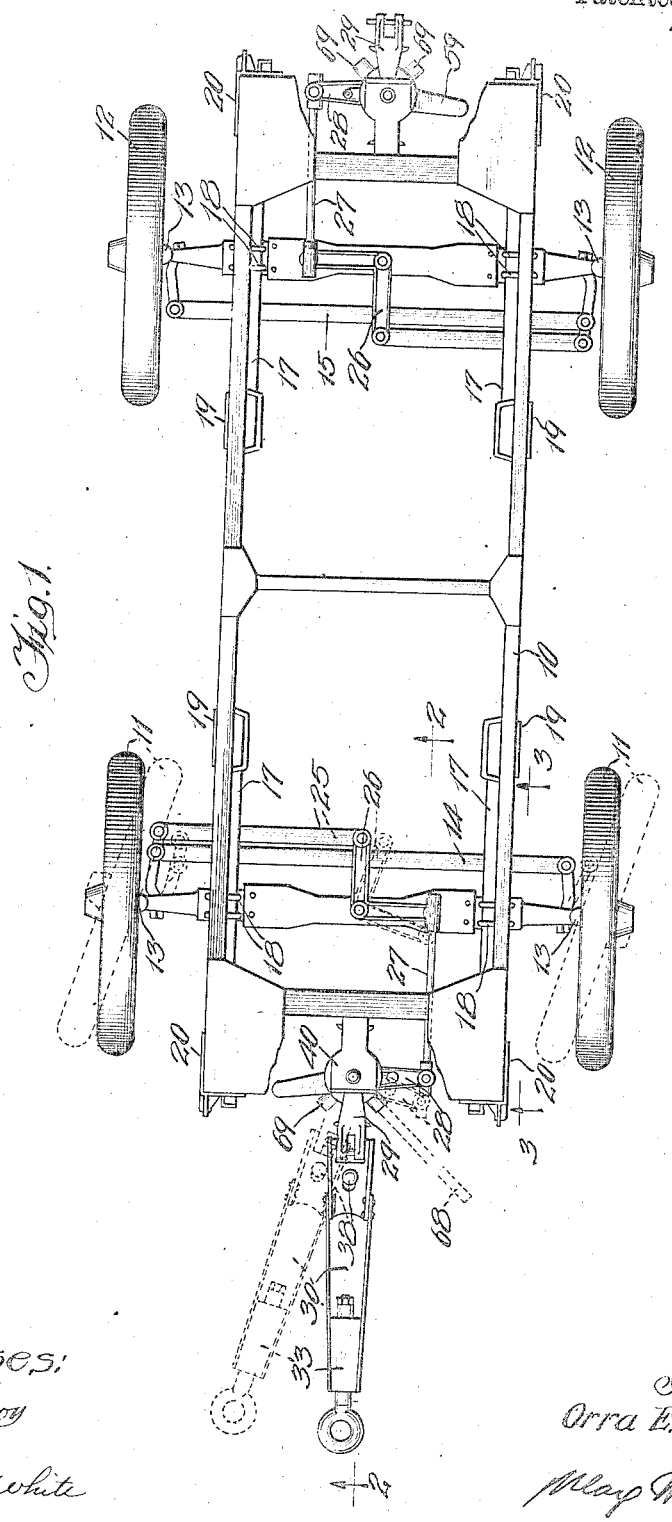

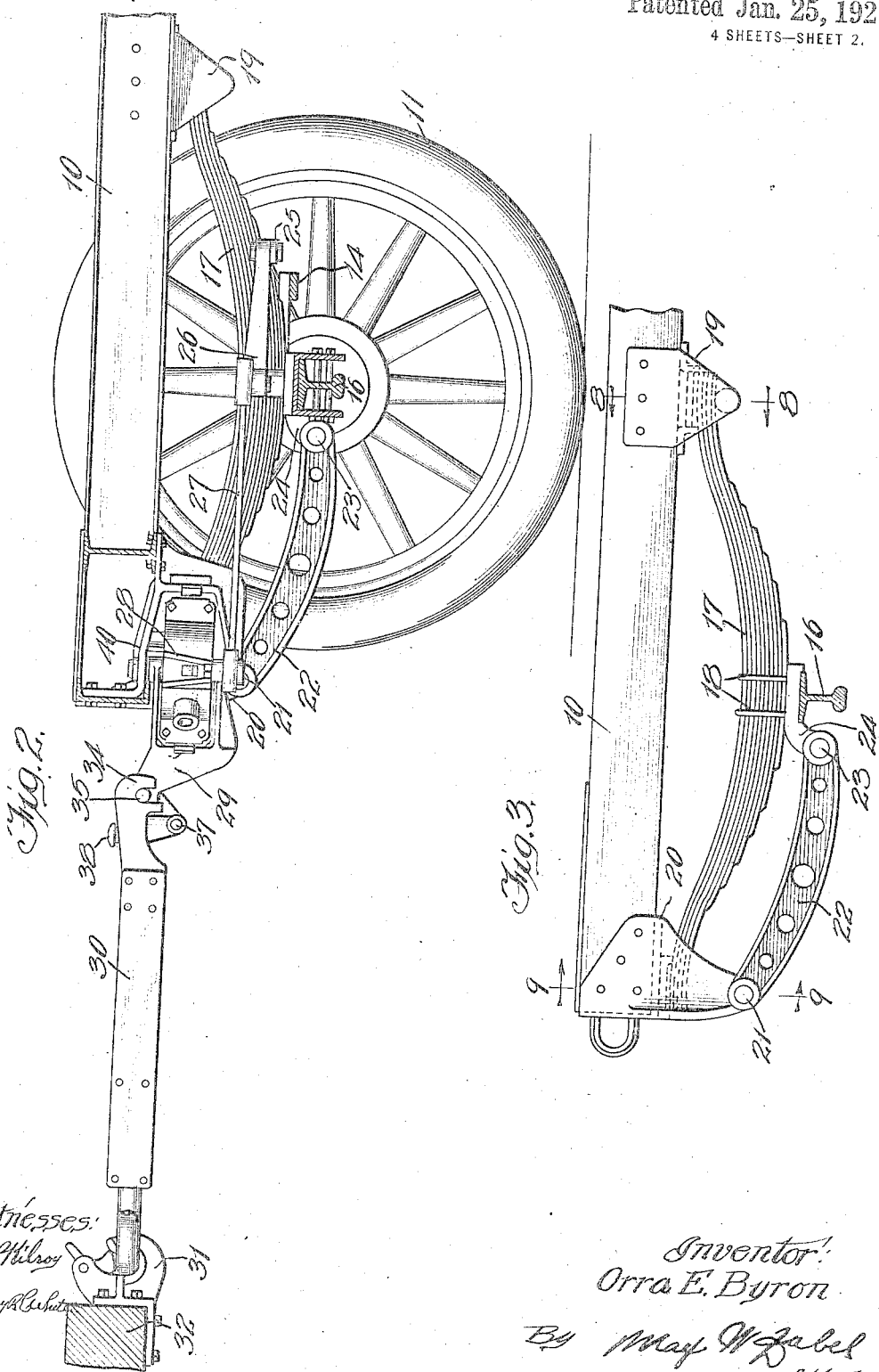

1,366,765.

Patented Jan. 25, 1921.
4 SHEETS—SHEET 3.

Witnesses:
W. F. Kilroy
Harry R. L. White

Inventor:
Orra E. Byron
By Max W. Zabel
Atty

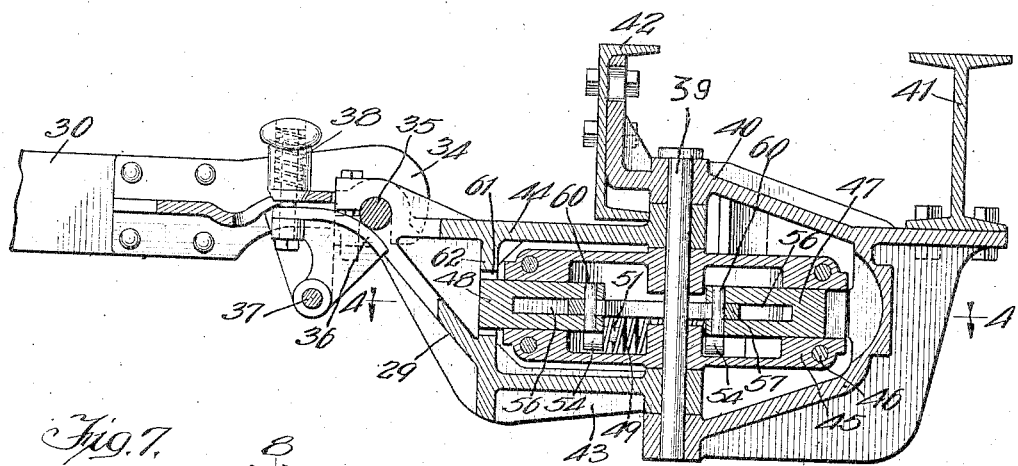
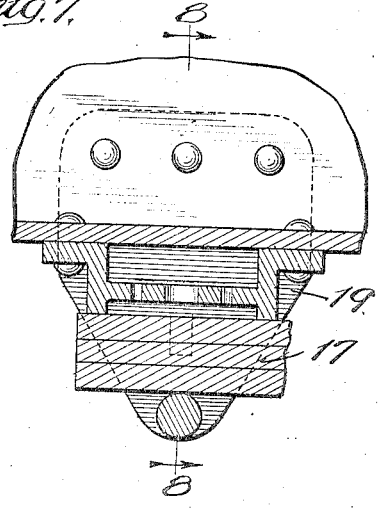
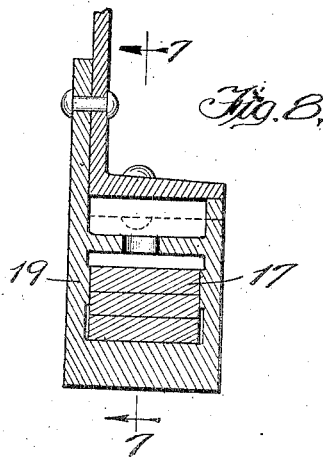
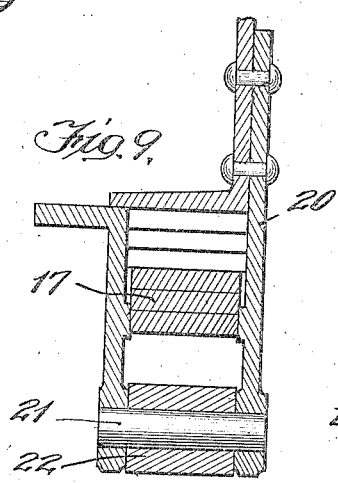

UNITED STATES PATENT OFFICE.

ORRA E. BYRON, OF CHICAGO, ILLINOIS, ASSIGNOR TO LEE LOADER & BODY CO.

TRAILER.

1,366,765.        Specification of Letters Patent.     Patented Jan. 25, 1921.

Application filed February 18, 1918. Serial No. 217,816.

*To all whom it may concern:*

Be it known that I, ORRA E. BYRON, a citizen of the United States, residing at Chicago, in the county of Cook and State of Illinois, have invented a certain new and useful Improvement in Trailers, of which the following is a full, clear, concise, and exact description, reference being had to the accompanying drawings, forming a part of this specification.

My invention relates to trailers and has for its object the provision of a trailer which may be suitably attached to an automobile or other vehicle and is drawn thereby.

My invention concerns itself primarily with the provision of means whereby the draw bar structure for the trailer is placed in its most effective position relative to the body of the trailer.

My invention further concerns itself with improved steering mechanism for the trailer.

My invention further concerns itself with a novel draw bar structure and mechanism.

These and other objects of my invention will be readily apparent from a detailed description of one form of my invention, as illustrated in the accompanying drawings, in which:

Figure 1 is a top view of the chassis of my improved trailer;

Fig. 2 is a fragmentary sectional view on line 2—2 of Fig. 1;

Fig. 3 is a fragmentary side view on line 3—3 of Fig. 1;

Fig. 6 is a sectional view of line 6—6 on Fig. 4;

Fig. 7 is a sectional view on line 7—7 on Fig. 8;

Fig. 8 is a sectional view on line 8—8 of Figs. 7 and 3, and

Fig. 9 is a sectional view on line 9—9 of Fig. 3.

Figure 4:
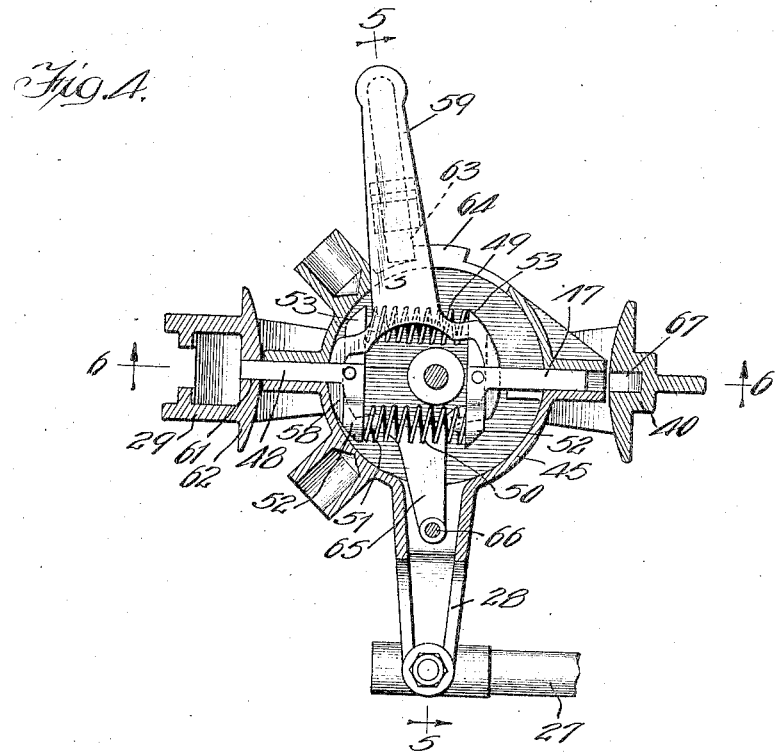
Fig. 4 is a sectional view on line 4—4 of Fig. 6.

Referring more particularly to Figs. 1, 2, and 3, I show a trailer chassis consisting of the framework 10, carrying four wheels, 11, 11 and 12, 12. Each of the four wheels are mounted upon knuckles 13 so that each of the wheels may be turned when the respective tie rods 14 or 15 are actuated. Normally but one set of wheels are operated at a time, the remaining pair being locked in their central position. However, the construction is such that all four wheels may be actuated under certain conditions, all as will more readily appear as the description of the device progresses. The chassis includes axles 16, preferably formed of T-irons, there being springs 17 interposed between the axles and the chassis. These springs 17 are rigidly fastened to the axles by the straps 18, as shown more clearly in Fig. 3, but are slidably carried in blocks 19 and 20, as shown more clearly in Figs. 3, 7, 8 and 9.

As there is relative motion between the axles and the truck body, the extremities of these springs may thus slide to and fro in their mounting blocks 19 or 20 respectively. The blocks 20, however, of which there are four, one at each of the four corners of the chassis, carry bolts 21 which support links 22, these links carrying bolts 23 at their opposite extremities mounted in yokes 24 suitably mounted on the axles 16. The position of the axles relative to the chassis is thus fixed without interfering with the freedom of movement between the axles and the chassis as the axles and chassis approach each other or recede. The object of thus mounting the axle will be more clearly apparent later, but it must be stated at present, that the actuating mechanism, which turns the wheels and which at one extremity is fixedly secured to the chassis, and at the other extremity is secured to the axle, must also permit of play between the axle and chassis without disarrangement in order to effect this result.

The tie rod 14 or 15 is operated by the links (Fig. 1) 25 which is pivotally associated with the bell crank lever 26, this bell crank lever being associated through the intermediation of the link 27 with a control bracket 28. The pivotal mounting of the left hand extremity of the control bracket (Figs. 1 and 2) is practically in line with the axis of the bolt 21 so that if the axle 16 moves up and down about the bolt 21, as a pivot, the right hand extremity of the link 27 may move up and down, swinging about its left hand mounting as a pivot, without causing a change in the position of the bell crank lever 26 sufficient to cause a turning of the wheels. There is a universal mounting of the left hand extremity (Fig. 1) of the link 27, as shown more clearly in Fig. 5. This universal joint permits the actuation of the link 27 through the agency of the control bracket 28, regardless of the relative positions of the axle and chassis.

In accordance with my invention I place the pivotal mounting for the draw bar block 29, considerably forward of the axle 16 and preferably in vertical alinement with the axis of the bolt 21. The draw bar block 29 is associated with the draw bar 30, this draw bar in the left hand extremity (Fig. 2) being held in a clamping hook 31 provided at the rear extremity of the truck or vehicle 32, which draws the trailer. This hook 31 is considerably to the rear of the rear axle of the truck 32 and this has an important bearing on the control of the trailer as will presently appear. The draw bar 30 has a spring chamber 33 and as seen more clearly from Figs. 2 and 6 has the U-shaped extremity 34 which sets over the bolt 35 carried by the draw bar block 29. In order to hold the draw bar in position upon the draw bar block, I provide a movable segment 36 pivotally mounted on the bolt 37 which is controlled by the catch pin 38. When the parts are in the position shown in Fig. 6, this segment 36 prevents the withdrawal of the draw bar from the bolt 35. When, however, it is desired to disconnect the draw bar from the bolt 35, then the frame work carrying the segment 36 is swung about the bolt 37, until it clears the bolt 35, this being permitted by a release of the spring catch 38. When the framework carrying segment 36 has been swung sufficiently to clear the bolt then the draw bar may be removed. The draw bar block 29 is pivotally held by a bolt 39 which is supported in the yoke 40 carried upon the I beam 41 and channel 42, forming parts of the chassis. By means of suitable mechanism now to be described the control bracket 28 may or may not be locked to move with the draw bar block 29. If it is locked in position to move with the draw bar block, then the wheels 11, 11 will correspond in angular position substantially to the angular position occupied by the draw bar 30.

Of course, the arrangement of the links and lever interposed between the draw bar 30 and tie rod 14 may be of any character desired, but in the present illustration the dimensions are such that the wheels 11 will occupy practically the same angular position that is occupied by the draw bar 30. The trailer is so arranged that under normal operation the wheels 12 would be locked to prevent steering, whereas the wheels 11 would be automatically steered in accordance with the position occupied by the draw bar 30. If the trailer is reversed so that the wheels 12, 12 occupy the front end, then the reverse would be true. However, there are conditions of operation, as when backing up, or even under certain conditions when it may be desired to place the trailer sidewardly of the truck which draws it, when the rear wheels, which in the illustration of Fig. 1 are shown to be the wheels 12, may be steered at the same time that the wheels 11 are steered. The structure which I have described readily permits of this. Through the agency of the construction which has thus far been described certain features of steering will be apparent. For instance, as the body 32 of the drawing truck is turned to swing a corner toward the right then the tail end which overhangs the rear axle to the right moves to the left. Thereupon the wheels 11 of the trailer are swung in a direction to steer the trailer to the left for a short space of time. Subsequently, of course, the draw bar 30 is swung in the opposite direction to guide the wheels 12 around the corner to the right. This initial movement of steering the trailer to the left however, serves to practically direct the trailer in the same path which was taken by the truck which draws it. This result is accomplished through the agency of my invention in having the pivotal mounting of the draw bar block a considerable space forwardly of the axle so that the distance between the pivotal mounting of the draw bar block and the hook 31 may be somewhat nearly equal to the distance between the hook 31 and the axle of the truck which draws the trailer.

Figure 5:
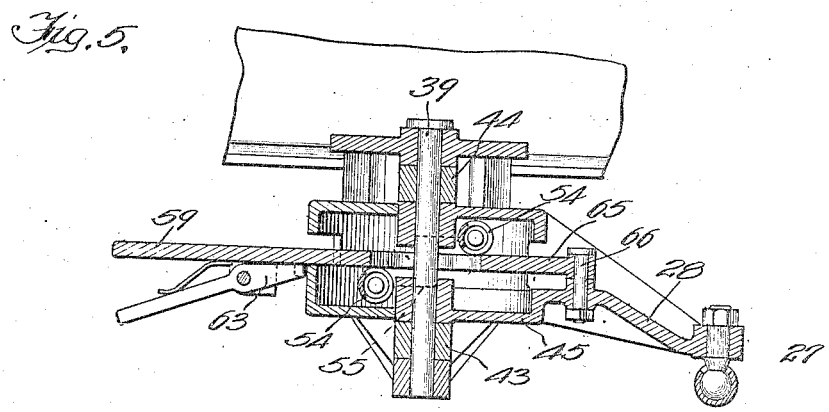
Fig. 5 is a sectional view of line 5—5 on Fig. 4.

I will now describe more in detail the mechanism associated with the draw block and the yoke 40, whereby the draw bar block may be locked to the control bracket 28 or whereby the draw bar block 29 may be disconnected from the control bracket 28. In this latter event the control bracket 28 however is locked in position to maintain the wheels controlled thereby in their non-steering position. This structure is shown more in detail in Figs. 4, 5 and 6. Between the arms 43 and 44 of the control bracket 29, I mount a rotatable framework 45 preferably made in two halves and held together by pins 46. This rotatable framework carries two locking pins, respectively the locking pin 47 and locking pin 48. These locking pins are held in a separated position by springs 49 and 50, these springs being held in position by means of lugs 51, as is readily apparent. The locking pins 47 and 48 have sidewardly extending arms 52 and 53, the arms 52 above and the arms 53 below, which extend to opposite sides and which coöperate with the springs aforesaid, these arms 52 and 53 having respectively downwardly and upwardly extending lugs 54, (Figs. 5 and 6). This makes a sort of Z-shaped structure of the arms extending from the locking pins 47 and 48, the structure of which will be more readily apparent when read in connection with the dotted lines shown at 55 in Fig. 5. The locking pins are each provided with a slot 56 within which slots a cam 57 slidably operates, this cam being controlled by the handle 59. The cam engages pins 60 carried respectively by the locking pins 47 and 48. It will thus be seen that these locking pins are forced away from each other by the springs 49 and 50 so that the pins 60 always engage the extreme opposite faces of the cam 57. The arrangement is such that when the locking pin 48 is in its extreme left hand position (Fig. 4) as shown, then the locking pin 47 is also in its left hand position. Under this condition of things the locking pin 48 engages the slot 61 provided in the plate 62 forming part of the draw bar block 29. The framework 45 carrying the locking pins forms part of the control bracket 28. Thus in the position of the parts shown in Fig. 4, the control bracket 28 moves directly with the draw bar block 29 and its position is hence governed by the position of the draw bar 30.

Thus, if the handle 59 is in the position shown, the wheels 11 are steered by the draw bar 30. The arm 59 has a spring catch 63 which holds it in position on one side or the other of the lug 64. The arm 59 is integral, as stated, with the cam 57 and has a further extending arm 65 pivoted upon the bolt 66. Now, whenever it is desired to prevent steering of the wheels 11 by the draw bar 30 and to actually lock the wheels 11 against steering, then the handle 59 is moved to its reverse position with the spring catch 63 on the opposite side of the lug 64, whereupon the locking pin 48 is withdrawn from the slot 61. It will be seen that under these conditions the movements of the draw bar block 29 no longer influences the control bracket 28. At the same time that this is done, however, the locking pin 47 engages the slot 67 provided in the yoke 40, thereby preventing any movement of the control bracket 28. The wheels 11 would in that condition be locked against steering. Now, should it be desired, for instance, when backing up, to operate the wheels 12 (Fig. 1), then the handle 59 is moved to the reverse position it occupies in Fig. 1, whereupon the control bracket 28 associated with the wheels 12 is locked to its coöperating draw bar block 29. The wheels 12 may then be steered by hand upon the insertion of a handle 68, shown in dotted lines at the left hand extremity of Fig. 1, into one of sockets 69 provided for its reception. Of course, in thus operating what would then be the rear wheels, it is not in reality necessary to lock the framework 45 to the draw bar block 29, the main object being to unlock the framework 45 from its engagement with the yoke 40. Under certain conditions of operation it may be desirable to effect this unlocking without at the same time locking the framework 45 to the draw bar block 29, but as here shown, there is no harm in having the draw bar block 29 move with the control bracket 28 when the framework 45 is actuated by hand.

It will also be understood that the springs 49 and 50 are of value should the draw bar block 29 be out of alinement with the locking pin 48, at which time it may be desired to lock the draw bar block and the framework 45 together. Under this condition of things the handle 59 is merely moved into the position of Fig. 4, whereupon the pin 48 impinges upon the extension 62. As soon as the draw bar block 29, during the subsequent movement of the trailer, alines itself with the trailer, the springs force the pin 48 directly into the slot 61 provided for its reception.

It will also be noted that a swinging up and down movement of the draw bar 30 by reason of the mounting of the draw bar supporting mechanism will not in any way obstruct or injuriously affect the steering of the front wheels in accordance with the steering position of said draw bar.

From what has been thus described the nature of my invention will be readily apparent to those skilled in the art.

Having however thus described one form which my invention may take, what I claim as new and desire to secure by Letters Patent is:

1. A trailer having an axle, wheels pivoted on said axle, a frame, springs interposed between the axle and the frame, links pivotally connecting the axle to the frame, a bell crank lever pivoted on the axle and connected with the wheels to steer the same, and a draw bar operatively connected to the bell crank lever and centrally pivotally mounted on the frame forwardly of the axle, said draw bar turning about said pivot when steering said wheels.

2. A trailer having a front axle, wheels pivoted to the axle, a draw bar support centrally pivotally mounted forwardly of the front axle, a bell crank lever carried by the axle and having means movable therewith to steer the front wheels, and means connecting the draw bar support to said lever said draw bar turning about said pivot when steering said wheels.

3. A trailer having a framework, a front axle, and steerable front wheels, a draw bar support substantially centrally pivotally mounted forwardly of the front axle near the forward end of said framework, a bell crank lever carried by said axle and having means movable therewith to steer said wheels, means connecting said draw bar support with said lever, and a draw bar carried by said support and turning about said pivot when actively steering said wheels.

4. A trailer having a front axle and wheels pivoted thereto, a draw bar support centrally mounted forwardly of the axle, springs interposed between the support and the wheels, means associated with said draw bar support for steering said wheels, and means for connecting and disconnecting said first aforesaid means with said draw bar support, said first aforesaid means including a tie rod, a lever pivoted on the axle and operatively connected to the tie rod and a link connecting the lever to said support said draw bar turning about said pivot when steering said wheels.

5. A trailer having a framework, a front axle, and wheels pivoted to the axle, a draw bar support substantially centrally pivotally mounted forwardly of the front axle on said framework near the forward end thereof, means for steering said wheels connected to said draw bar support and movable therewith, and a draw bar carried by said support and turning about said pivot when actively steering said wheels.

6. A trailer having front wheels, a draw bar mounted forwardly of the normal axis of said wheels, a spring interposed between the draw bar and the wheels, means associated with said draw bar for steering said wheels, means for connecting and disconnecting said first aforesaid means with said draw bar, and simultaneously disconnecting and connecting said first aforesaid means against movement, said last aforesaid means including a pair of horizontally moving locking pins, and a framework carrying said locking pins connected with said first aforesaid means.

7. A trailer having an axle, wheels pivoted on said axle, a frame, a draw bar support, means for steering said wheels, and means whereby said draw bar support and steering means are adapted to move in unison or independently, said means comprising a member carried by said steering means, a pair of horizontally alined movable locking bolts mounted in said member and adapted to coöperate with apertures in said draw bar support and said framework and means whereby one of said bolts is withdrawn from its coöperating aperture when the other thereof enters its respective aperture.

8. A trailer having a frame, an axle and front wheels, a draw bar centrally pivotally mounted on said frame forwardly of the axle and said wheels, links connecting the axle to the frame, and means pivotally mounted on the axle in alinement with said pivotal mounting of the draw bar and connected to said draw bar for steering said wheels said draw bar turning about said pivot when steering said wheels.

In witness whereof I hereunto subscribe my name this 15th day of January, A. D. 1918.

ORRA E. BYRON.